Oct. 7, 1969 R. F. McLEAN 3,470,827
HIGH-SPEED LAND TRANSPORTATION SYSTEM
Filed Feb. 27, 1967 2 Sheets-Sheet 1
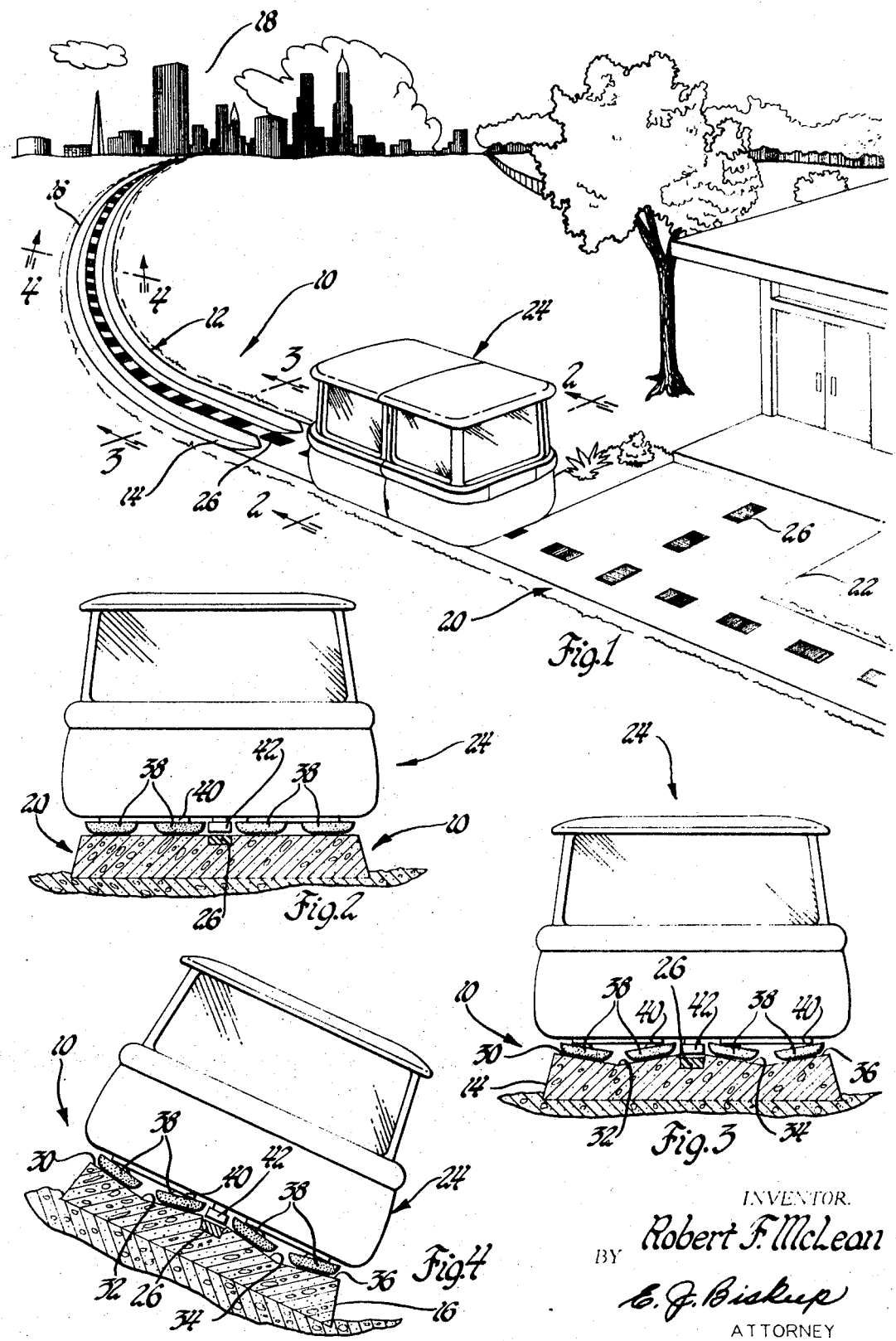
INVENTOR.
Robert F. McLean
BY
C. J. Biskup
ATTORNEY Oct. 7, 1969    R. F. McLEAN    3,470,827
HIGH-SPEED LAND TRANSPORTATION SYSTEM
Filed Feb. 27, 1967    2 Sheets-Sheet 2
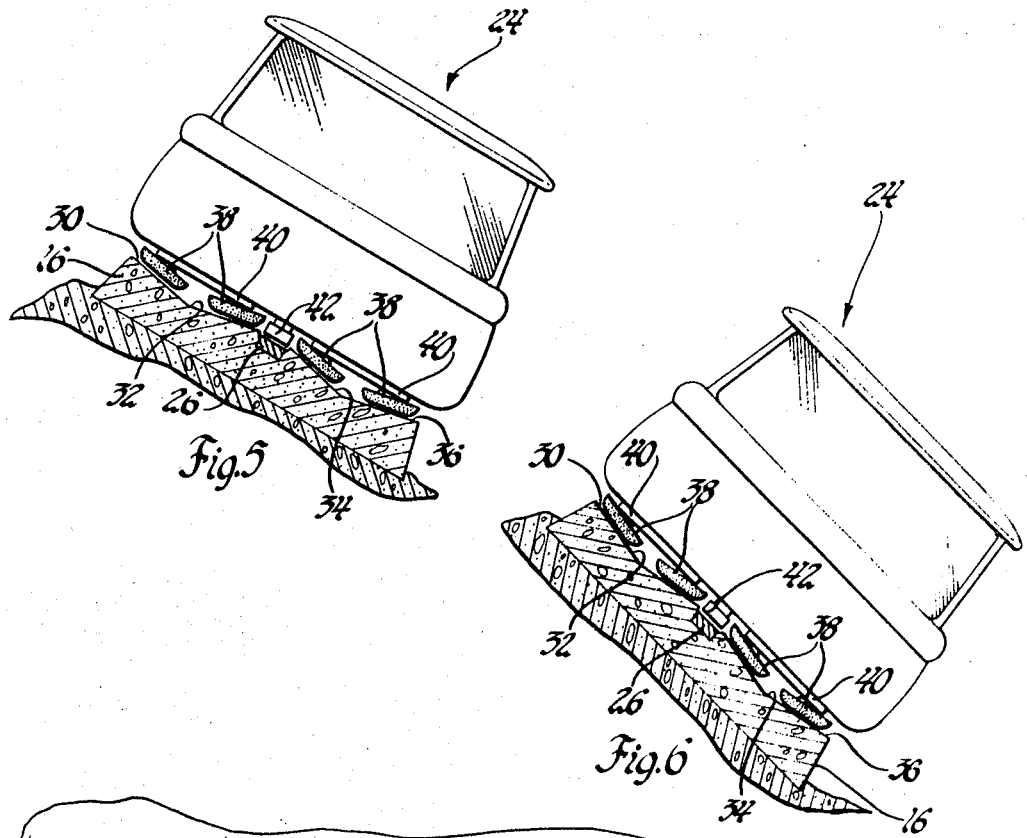
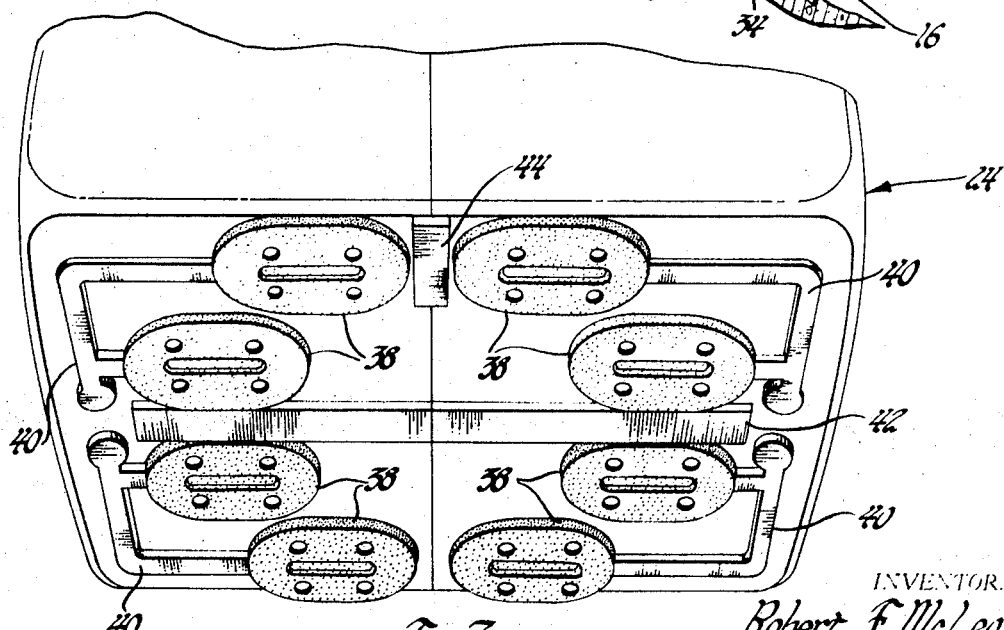
INVENTOR.
Robert F. McLean
BY
E. J. Biskup
ATTORNEY United States Patent Office 3,470,827
Patented Oct. 7, 1969

3,470,827
HIGH-SPEED LAND TRANSPORTATION SYSTEM
Robert F. McLean, Birmingham, Mich., assignor to General Motors Corporation, Detroit, Mich., a corporation of Delaware
Filed Feb. 27, 1967, Ser. No. 618,938
Int. Cl. B60v 3/04; A36g 21/20; B62d 57/00
U.S. Cl. 104—134                                    6 Claims

ABSTRACT OF THE DISCLOSURE

A high-speed land transportation system for a vehicle which is supported by a plurality of air-operated levitation devices. The transportation system includes a road system for the vehicle that has spaced marshalling stations interconnected by a trackway formed as a double V in cross section for accommodating the levitation devices. The marshalling stations are formed with a flat surface so that the vehicle can be shuttled laterally with respect to the trackway for loading and unloading.

---

This invention concerns a ground effect air-supported high-speed land vehicle and guiding means therefor. One example of a high-speed land transportation system can be seen in the patent to Amann et al. 3,096,728 which is assigned to the assignee of this invention. This patent discloses an arrangement of the stated character wherein a continuous rail structure in the form of a monorail of generally V-shaped cross section is provided. The laterally opposite surfaces of the monorail extend generally parallel to similarly inclined runners on the underside of the vehicle. The runners are supported in spaced relation from the track surfaces by a low pressure air bearing means having effective bearing area nearly equal to the plan frame area of the vehicle. One advantage of the above-described transportation system is that it eliminates many of the practical problems associated with air bearing supports and provides stability with respect to lateral swaying. The rigid mounting of the air bearing means and the V track configuration, however, restricts the use of the system to specifically designed trackways and therefore complicates marshalling and shuttling of the vehicle when desired.

Accordingly, the objects of the present invention are to provide a high-speed transportation system having a contoured trackway which provides stability for an air-supported vehicle; to provide a track system for an air-supported vehicle that permits the latter to be automatically guided between stations and readily removed from the trackway at desired locations; to provide a track system for an air-cushioned vehicle that is transitive in design so as to permit the vehicle to move laterally at predetermined locations in the trackway; and to provide an air-supported vehicle having levitation devices which adjust automatically during travel along a transitive roadway.

The above objects and others will be more apparent from the following detailed description taken with the drawings in which:

FIGURE 1 is a perspective view showing a vehicle mounted on a trackway made in accordance with the invention;

FIGURE 2 is a view taken along line 2—2 of FIGURE 1;

FIGURE 3 is a view taken along line 3—3 of FIGURE 1;

FIGURE 4 is a view taken along line 4—4 of FIGURE 1;

FIGURES 5 and 6 are similar to FIGURE 4 with the roadway being progressively increased in the bank angle, and FIGURE 7 is a view showing the undercarriage of the vehicle of FIGURE 1.

Referring to the drawings and more specifically FIGURE 1 thereof, a high-speed transportation system made in accordance with the invention is shown comprising a road system 10 having a trackway 12, a portion 14 of which is shown as being a straightaway and another part 16 curving and leading toward a city 18 depicted as located in the distance. The straightaway portion 14 of the road system 10 leads into a marshalling station 20 which includes an apron 22 offset from the normal straightaway portion of the trackway 12. A vehicle 24 is located on the trackway and is intended to travel therealong under the control of an electric linear motor, the stator portions 26 of which are embedded in the roadway, while the rotor is mounted on the vehicle 24 in a manner to be described below.

The road system 10 is constructed so as to be transitional in cross sectional design as indicated in FIGURES 2 and 3. In other words, at each marshalling station 20 the trackway 12 assumes a flat or level configuration and then gradually merges into a double V type configuration defined by inclined surfaces 30, 32, 34 and 36 as illustrated in FIGURES 3 through 6. Thus, during cross-country travel between marshalling stations, the trackway 12 takes the double V type form so as to provide lateral stability and guidance for the vehicle suspended by a plurality of levitation devices 38 as seen in FIGURE 7. Regarding the latter, each levitation device 38 is a low pressure air bearing construction which conforms generally in structure to that disclosed in copending patent application Ser. No. 526,943 Mackie et al. entitled Air Cushion Device, filed Jan. 19, 1966, now Patent No. 3,321,038. In this case, each side of the vehicle is provided with four of the devices, each pair being interconnected through a common conduit means 40 which leads to a source of low pressure air, not shown.

Located along the longitudinal axis of the vehicle 24 is an elongated bar 42 which constitutes the rotor portion of the linear motor that propels the vehicle. A similar bar 44 is provided along one side of the vehicle along an axis substantially perpendicular to that of the bar 42 and serves a function which will be explained hereinafter. Although not shown, both of the bars 42 and 44 are mounted for independent vertical adjustment so as to increase and decrease the air gap between themselves and the embedded stator portions 26 in the trackway 12. Also, each of the air bearing devices 38 is pivotally connected to the vehicle 24 so that they can readily adjust to the configuration of the trackway 12 as the vehicle moves along the road system between stations.

As seen in FIGURE 1, the vehicle 24 has just completed its travel along the double V portion of the trackway 12 at which time the air bearing devices 38 were inclined with respect to the vehicle as shown in FIGURES 3 through 6. As the vehicle 24 approaches the unloading or marshalling area 20, it gradually decreases its speed and comes to a stop when in line with the laterally extending stator portions 26 formed in the apron area 22. At that time, the rotor 44 is lowered for reaction with the transverse stator portions thereby permitting the vehicle 24 to be shuttled laterally with respect to the trackway 12 permitting the passengers to disembark. When the vehicle is ready for departure, it will move back toward the trackway 12 under the control of the linear motor.

The linear motor intended to propel the vehicle 24 is well known in the prior art and generally involves an induction motor which has been split axially along the air gap and opened out into a flat or developed structure.

As should be apparent, a linear induction motor can be operated with the stator embedded in the trackway, as described above, or carried on the vehicle. When the stator is embedded in the trackway, variable speed during acceleration and deceleration can be obtained from a constant frequency power source by increasing the pole pitch as the distance from the station is increased. Moreover, the spaced stators can be progressively energized as the vehicle moves along by use of trip switches activated by the vehicle. In any event, it will be understood that the invention in this case resides in the road system and the manner that the levitation devices are supported by the vehicle. The means for propelling the vehicle, although in the preferred form being a linear electric motor, may take other forms well known to those skilled in the art.

Various changes and modifications can be made in this construction without departing from the spirit of the invention. Such changes and modifications are contemplated by the inventor.

I claim:

1. A high-speed transportation system comprising, a vehicle, a plurality of air-operated levitation devices pivotally connected to said vehicle, a road system for said vehicle having spaced marshalling stations interconnected by a trackway, said trackway having a double V configuration in cross section for accommodating said levitation devices and providing lateral stability and guidance for the vehicle, and said marshalling stations having a flat and substantially level configuration whereby said vehicle may be shuttled laterally with respect to said trackway.

2. The high-speed transportation system of claim 1 wherein a linear electric motor drives said vehicle.

3. The high-speed transportation system of claim 2 wherein the stator portion of said motor is embedded in a road system and the rotor portion is mounted on said vehicle.

4. The high-speed transportation system of claim 3 wherein said stator portion on said vehicle consists of a pair of metal strips, one of which extends longitudinally and the other transversely of the vehicle.

5. The high-speed transportation system of claim 3 wherein each marshalling station has the stator portions of the linear motor extending at an angle to the stator portions embedded in the road system so that the vehicle may move laterally with respect to the latter.

6. The high-speed transportation system of claim 4 wherein said transverse metal strip on said vehicle is adjustable vertically.

References Cited

UNITED STATES PATENTS

| | | | |
|---|---|---|---|
| 3,090,327 | 5/1963 | Crowley | 104—134 |
| 3,096,728 | 7/1963 | Amann et al. | 104—23 |
| 3,174,440 | 3/1965 | Cockerell | 104—134 |
| 3,330,221 | 7/1967 | Trillo | 104—134 |
| 3,369,497 | 2/1968 | Driver et al. | 104—134 |
| 3,373,697 | 3/1968 | Hartie | 104—23 |

FOREIGN PATENTS 1,238,499  7/1960  France.

DRAYTON E. HOFFMAN, Primary Examiner

RICHARD A. BERTSCH, Assistant Examiner

U.S. Cl. X.R.

180—7